US007234343B2

(12) United States Patent
Ducker et al.

(10) Patent No.: US 7,234,343 B2
(45) Date of Patent: Jun. 26, 2007

(54) METHOD AND APPARATUS FOR EVANESCENT FILED MEASURING OF PARTICLE-SOLID SEPARATION

(75) Inventors: William Ducker, Blacksburg, VA (US); John Walz, Guilford, CT (US); Spencer Clark, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 77 days.

(21) Appl. No.: 10/889,331

(22) Filed: Jul. 12, 2004

(65) Prior Publication Data

US 2006/0005615 A1  Jan. 12, 2006

Related U.S. Application Data

(60) Provisional application No. 60/550,731, filed on Mar. 8, 2004.

(51) Int. Cl.
 *G01B 5/28* (2006.01)
(52) U.S. Cl. .................... 73/105; 250/235; 250/307
(58) Field of Classification Search ................. 73/105; 250/306, 235, 307; 25/235
See application file for complete search history.

(56) References Cited

U.S. PATENT DOCUMENTS

| 4,947,034 | A | * | 8/1990 | Wickramasinghe et al. . | 250/216 |
|---|---|---|---|---|---|
| 5,539,197 | A | * | 7/1996 | Courjon et al. ............. | 250/216 |
| 5,894,122 | A | * | 4/1999 | Tomita ....................... | 250/234 |
| 6,580,852 | B2 | * | 6/2003 | Iyoki ........................... | 385/31 |
| 6,953,927 | B2 | * | 10/2005 | Quake et al. ............... | 250/234 |
| 2004/0232321 | A1 | * | 11/2004 | Miles et al. ................ | 250/235 |

OTHER PUBLICATIONS

Zenhausern et al. "Apertureless near-field optical microscope" Applied Physics Letters vol. 65, n. 13, Sep. 1994, pp. 1623-1625.*

Laddada et al. "Detection of an evanescent field scattered by silicon tips in an apertureless scanning near-field optical microscope" European Physical Journal, vol. 6, n. 2, 1999 no month, pp. 171-178.*

Novotny et al. "Near field optical imaging using metal tips illuminated by higher-order Hermite-Gaussian beams" Ultramicroscopy vol. 71, 1998 no month, pp. 21-29.*

(Continued)

*Primary Examiner*—Michael Cygan
(74) *Attorney, Agent, or Firm*—Houston Eliseeva LLP

(57) ABSTRACT

Evanescent wave scattering by a scanning probe in a scanning probe microscope is utilized to determine and monitor separation between a scanning probe and a sample. A laser light is totally internally reflected at the interface between a more optically dense (incident) medium and less optically dense (transmitting) medium, exciting a decaying evanescent field in the less optically dense medium. A scanning probe, such as a colloidal probe, is dipped into the evanescent field, which scatters off the scanning probe. The portion of the scattered field propagates back into the incident medium and is then detected by a detector. A dependency between the intensity of the scattered evanescent field and the separation between the probe and the incident medium was measured and used in determining the separation. This dependency of intensity is used to prepare images or maps of interfaces. A particular application of determining the separation between the probe and the sample in an atomic force microscope is disclosed.

29 Claims, 10 Drawing Sheets

OTHER PUBLICATIONS

Knoll et al. "Near-field probing of vibrational absorption for chemical microscopy" Nature, vol. 399, May 1999, pp. 134-137.*

Wei et al. "Scanning tip microwave near-field microscope" Appl. Phys. Lett vol. 68, n. 24, Jun. 1996, pp. 3506-3508.*

Stranick et al. "Microwave evanescent probe microscopy for materials analysis" http://www.cstl.nist.gov/div837/837.03/highlite/uwaves2000.htm, printed Feb. 2004.*

M. Specht et al. "Scanning Plasmon Near-Field Microscope" Physical Review Letters vol. 68, No. 4, Jan. 27, 1992.*

McKee et al. Relationship between Scattered Intensity and Separation for Particles in an Evanescent Field. Langmuir, 2005, pp. 5783-5789, vol. 21, American Chemical Society, Columbus, USA.

McKee et al. Refractive Index of Thin, Aqueous Films between Hydrophobic Surfaces Studied Using Evanescent Wave Atomic Force Microscopy. Langmuir, 2005, pp. 12153-12159, vol. 21, American Chemical Society, olumbus, USA

* cited by examiner

US 7,234,343 B2

METHOD AND APPARATUS FOR EVANESCENT FILED MEASURING OF PARTICLE-SOLID SEPARATION

RELATED APPLICATIONS

This application claims the benefit of an earlier filing date of U.S. provisional patent application Ser. No. 60/550,731 filed on Mar. 8, 2004 which is incorporated herein by reference in its entirety.

STATEMENT REGARDING FEDERALLY SPONSORED RESEARCH OR DEVELOPMENT

The subject matter of this application was funded by the U.S. Government, National Science Foundation under contract No. DMR-0216129.

BACKGROUND OF THE INVENTION

The present invention relates to use of scattered evanescent electromagnetic field for direct distance measurements. More specifically, the present invention relates to using evanescent electromagnetic field generated by total internal reflection for measuring separation between a sample and a probe in a scanning probe microscope.

One of the first techniques developed to measure surface forces of a sample was the development of the Surface Force Apparatus (SFA) in the 1970s which led to the first accurate measurement of many of such forces An SFA employs an interferometer using Fringes of Equal Chromatic Order (FECO). The distance between the silver-coated back-sides of mica sheets is determined from the wavelength of constructive interference for light in the gap between the silver layers. If one assumes that the thickness and refractive index of the mica sheets is constant throughout the measurement, then the thickness of a film intervening between the mica sheets can be measured using the wavelength at that thickness, and a three-layer optical model. The existence of a convenient wavelength standard (e.g. a mercury lamp) is a critical advantage for an interferometric technique such as FECO. The spectrometer wavelength can be frequently calibrated so that an absolute comparison can be made between wavelength measurement when the two mica sheets are in contact and the wavelength when there is an intervening film. In this sense, the SFA separation axis gives the absolute distance between mica sheets in some reference 'contact' position and all subsequent positions. Specifically, even after the adsorption of a thin film to the mica surface, the force can still be measured as a function of the separation between the mica sheets.

Scanning probe microscopes are the tools often used to profile a surface of a sample at an atomic level by approaching the surface with a probe and measuring tunneling currents or force between the tip of the probe and the surface. The tip of the probe may interact with the surface via a variety of surface effects, such as electron tunneling, interatomic forces, capacitive coupling, friction forces, magnetic forces, van der Waals forces, electrostatic double layer forces and other electrostatic forces, hydration forces, frictional forces, and oscillatory packing forces.

An Atomic Force Microscope (AFM), which is one of the types of the scanning probe microscopes, emerged in early 1990s as a as a valuable technique for surface force measurements, particularly when employed with a large spherical colloidal particle (r~3 µm) attached to the force sensor. In an AFM, the probe is attached to a flexible cantilever or a spring, which in turn is attached to the force sensor. The probe can be a sharp tip (with the end radius of about 30 nm) or a spherical colloidal particle (with a radius of about 3 µm) which moves above the surface. If the cantilever control mechanism is constructed so that the force acting on the probe from the interaction with the surface remains constant, the probe will closely follow the profile of the surface. By detecting the motion of the cantilever (for example by detecting the reflection of a laser beam directed at it) it is therefore possible to determine the profile of the surface at the atomic level. These methods are known in the pertinent art and their details are beyond the scope of this invention.

Compared to the use of a sharp AFM tip, force measurement with a spherical colloidal particle (the colloid probe technique) improves the signal to noise ratio, and the known geometry allows the interpretation of results in terms of the energy per unit area, which is the intensive property used to compare forces in different geometries. The colloidal probe technique has many advantages including the ease of use of the instrument; the availability of AFMs in many research labs and the ability to measure forces on a variety of materials, including large colloidal particles and low probability of encountering contamination, as compared to the SFA technique. This latter advantage arises from the fact that the interacting area is about $10^4$ times smaller in a Colloidal Probe measurement than in an SFA measurement.

It should be noted that there is no explicit measurement of the separation between the probe and the surface in an AFM colloidal probe measurement. The colloidal particle is attached to one end of a spring and the other end of the spring (the fixed end) is driven by a piezoelectric crystal (the piezo-drive) toward an interface while the deflection is monitored. Instead of a piezoelectric crystal, a different type of electromechanical transducer may be used as long as it is capable of transforming an electronic signal into a mechanical displacement. Zero force is established from the deflection of the spring far from contact where there is zero gradient in the curve of deflection versus piezo-drive displacement or distance, as shown by the force profiles in FIGS. 1A and 1B discussed below. Hereinafter, the piezo-drive distance means the distance between a probe and a sample inferred from the signal applied to the piezo-drive. Contact with the surface is inferred from the shape of the force curve. The contact between the colloidal probe and the other solid is assumed to occur when the slope of a curve of deflection versus piezo-drive distance is constant (the constant compliance regime). This assumption is based on the idea that surface forces are seldom changed linearly with distance, and that the interacting objects are rigid, so that they do not deform during the interaction. A linear spring is a spring producing a linear force, i.e., the force that is proportional to displacement, the coefficient of proportionality is called the spring constant. When all other components that connect the interacting surfaces are rigid, the load on the probe consists of only the linear AFM spring and the non-linear surface force. If the compound force is linear, either the surface force is zero, meaning that the particle is far away from the surface or the net surface force gradient is large (i.e., much larger than the spring constant of the cantilever), which would occur at contact. When the particle is far from the sample, the region of constant compliance is assumed to be where hard contact occurs between the solids.

In principle, the contact position in the AFM could be referenced to a standard position of the piezo-drive and a standard deflection of the cantilever. In practice, the contact position is measured on each force-separation curve. This leads to ambiguity when comparing force-separation runs under different conditions of the probe, surface, and the medium between them. The reason for establishing the zero on each force-separation run is that changes in the dimensions of equipment components due to fluctuations in the temperature (thermal drift) make it very inconvenient to produce a standard deflection of the cantilever or a standard position of the fixed end of the cantilever.

In AFM measurements, the constant compliance regime is also used to calibrate the deflection of the spring. The spring deflection is usually measured using the light-lever technique. A change in the end slope of the spring under an applied force produces a change in the angle of a laser beam reflected from the end of the cantilever. This change in angle causes a large displacement of the reflected beam if the displacement is measured far from the spring. The displacement of the reflected beam is calibrated by placing the colloidal probe in contact with a solid that is much stiffer than the cantilever spring. When the piezo-drive is used to reduce the separation between the fixed end of the spring and the solid sample, the deflection of the free end of the cantilever is equal to the distance moved by the piezo-drive if the solid is infinitely stiff. If the solid is known to be compliant, then the calibration must be performed independently on a stiff sample.

FIGS. 1A and 1B show an example of force measurement data obtained in a traditional colloid probe AFM experiment. These particular forces were measured between a borosilicate glass particle and a fused silica surface in an aqueous 0.9 mM (millimolar or millimole per liter) hexadecyltrimethylammonium bromide (CTABr) solution.

FIG. 1A shows non-calibrated dependence of deflection of a cantilever on distance of the probe from the surface. The deflection was measured using a spring-mounted lever. The deflection in region 1 (far from the surface) is defined to correspond to zero force. Region 2, where the slope is constant, is defined to be zero separation. This region is also used to calibrate the deflection of the cantilever. Note that in region 3, the slope is very nearly constant but the separation is not zero.

FIG. 1B shows calibrated deflection versus separation data obtained using FIG. 1A. The force is the deflection times a spring constant. The shape of the force curve in region 3 is obtained from the very small difference between the slopes in regions 2 and 3.

In summary, in FIGS. 1A and 1B the region of constant compliance is used both to determine the zero of distance and to calibrate the deflection of the cantilever. Problems arise when certain made assumptions are violated, the wrong region is chosen, or when the data collection error in this region is too large. An example of the wrong region is region 3 in FIGS. 1A and 1B, where the slope is almost constant, but a smaller separation was later achieved. The sudden discontinuities in FIG. 1A (at distance of about 60 nm and deflection of about 0) and FIG. 1B (at about 3.5 nm) make it clear that the solids are not touching in region 3. The data presented in FIGS. 1A and 1B illustrate that there is no unique method for uniquely identifying contact between the interfaces with a region of constant compliance. This is particularly problematic if the aim of the experiment is to determine the effect of an adsorbate on the surface force.

The Total Internal Reflection Microscopy (TIRM) technique was developed at about the same time as the colloidal probe technique to measure the relative energy of the particle at various separations. TIRM can be used to obtain the energy-separation profile of a colloidal particle that is unencumbered by a cantilever spring. The particle can rotate and translate, and over time will adopt a distribution of states with a frequency that is determined by the energy through the Boltzmann distribution. Thus, the TIRM technique measures the frequency-separation histogram, which is then used to determine the relative energy of the particle at various separations; there is no explicit measurement of force.

Total internal reflection is based on the following phenomenon. Electromagnetic radiation or an electromagnetic wave (for example, light) propagating in a medium, such as vacuum, a gas, a liquid, or a solid, may encounter a location where the medium interfaces another medium with different electromagnetic properties. Upon encountering this interface a portion of the incident radiation crosses the interface into the second medium and the remainder of the incident radiation propagates within the first medium in a different direction; this remainder is commonly called reflected radiation or reflected wave. Consider two uniform media separated by a plane with indices of refraction $n_1$ and $n_2$, respectively and imagine a line perpendicular or normal to the plane. When an electromagnetic wave approaches the planar interface from the first media at an angle $\theta_i$ to the line normal to the plane (called the angle of incidence), a portion of the wave enters the second media from the first at the angle $\theta_2$ to this normal line (called the angle of refraction). These angles are related by Snell's law (also called the refraction law): $n_1 \sin \theta_i = n_2 \sin \theta_2$. As may be seen from this equation, when $n_1 > n_2$, above a certain angle of incidence $\theta_i$ there is no angle of refraction $\theta_2$ that would fit the equation, because the value of sine is less or equal than one for any real angle $\theta_2$. At the angles above a certain angle of incidence (called critical angle) no portion of electromagnetic wave crosses the interface between the media, but the incident radiation is totally reflected back to the $n_1$ medium, the phenomenon known as total internal reflection (TIR).

Direct measurement of a separation between the probe and the surface in a scanning probe microscope, such as an AFM, would have removed existing ambiguities from surface force measurements and would have allowed monitoring the forces at a known constant separation and exercising a much greater control over the position of the probe in the AFM applications.

SUMMARY OF THE INVENTION

The present invention allows obtaining explicit measurements of the particle-solid separation by measuring the intensity of light scattered by the particle in the evanescent field.

The method allows a user to determine separation between a first medium, which can be a solid sample or an incident medium onto which a sample can be deposited, and a scattering probe. The scattering probe is located in a second medium, which is usually a fluid (gas or liquid). The method comprises generating an evanescent electromagnetic field, which propagates beyond an interface between the first medium and the second medium into the second medium. Then a scattered electromagnetic field is generated by scattering the evanescent electromagnetic field off the scattering probe. Then the intensity and or distribution of scattered electromagnetic radiation is measured. The intensity is used to measure the separation between the first medium and the scattering probe.

An apparatus utilizing the evanescent wave scattering in determining a particle-solid separation has a first (incident) medium which has a boundary. The boundary lies either between the first medium and a second (transmitting) medium or between the first medium and a sample. The apparatus comprises means for generating an evanescent electromagnetic field propagating beyond the boundary and away from the first medium. Usually the decaying evanescent field is propagating in the second medium toward the particle. Further provided is means for measuring the intensity of a scattered electromagnetic field formed as a result of scattering of the evanescent electromagnetic field by the scanning probe and scattered back into the first medium. A detector coupled to the means for measuring serves to determine an intensity of the scattered electromagnetic field, which can be used in determining the separation.

In a particular implementation, an atomic force microscope has an evanescent scattering apparatus for measuring and monitoring/controlling the distance between a sample and a probe. In such atomic microscope a cantilever for holding a scanning probe or a sample is coupled to a piezo-drive which can translate the cantilever with the probe closer or further away from the sample, which can be a suitable incident medium. A laser source for generating a laser beam is directed onto the interface between the incident medium and either the second less optically dense medium or a sample for totally internally reflecting the laser beam at the interface and also for generating an evanescent electromagnetic field propagating toward the cantilever. An optical device is provided for capturing a portion of the evanescent electromagnetic field scattered by the scanning probe into the incident medium. The atomic force microscope is connected to the optical device, such as a microscope, in such a manner that the sample or probe of the atomic force microscope can displace translationally relative to the optical axis of the optical microscope. A detector coupled to the optical device detects the intensity of the portion of the evanescent electromagnetic field scattered by the scanning probe into the incident medium. Based on the determined intensity, a separation between the probe and the sample can be calculated.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

In the present invention an explicit measurement of a separation between the surface of a sample and the tip of the probe of a scanning probe microscope was obtained through measuring the intensity of light scattered by the probe placed in the evanescent field generated at the interface of a reflective element. It is noted that throughout this description the following terms are used interchangeably without limiting the meaning of each of the terms: "surface-boundary-interface", "prism-sample-reflecting element-solid", "wave-field-signal", "probe-particle probe".

When an electromagnetic wave is totally internally reflected within one medium on a media boundary or interface, on the other side of the boundary, in the lower refractive index medium, an electromagnetic field is generated. The strength of this field decays exponentially with the distance from the boundary. This field is known as an evanescent field or evanescent wave existing beyond total internal reflection medium (also called a reflection element).

When an object is placed into an evanescent field, it may alter the shape of this field and create a field propagating in a different direction or directions. This process is scattering which generates the scattered field. Usually the stronger the field is into which a scattering object is placed, the stronger is the scattered field.

The decay of intensity, L, of the evanescent wave as a function of distance from the interface of total internal reflection, h, is given by:

$$L(h) = L_0 \exp\left(\frac{-4\pi n_2}{\lambda}\beta h\right) \quad (1)$$

$$\beta = \sqrt{\left(\frac{n_1}{n_2}\right)^2 \sin^2\theta_i - 1},$$

where $L_0$ is the intensity of the incident electromagnetic radiation (which is also the intensity of the evanescent field at zero separation), $n_1$ is the refractive index of the incident medium, $n_2$ is the refractive index of the medium supporting the evanescent wave ($n_1 > n_2$), $\lambda$ is the wavelength of the electromagnetic radiation in vacuum, and $\theta_i$ is the angle of incidence relative to the normal.

If a colloidal particle or another scattering object dips into the zone of the evanescent field, some of the light is scattered (lost from the reflected beam). For the types of systems typically studied with the technique, the intensity of scattering by the particle, I, is proportional to the intensity of the evanescent wave, L, at a separation distance h. Thus the separation between the particle and the interface may be measured providing that that $I_0$, $n_1$, $n_2$, and $\theta_i$ are either known or may be measured. $\theta_i$, $n_1$, and $n_2$ are often fixed. However, there is no easy way of obtaining $I_0$. Therefore, to obtain the distance or separation when the probe and the reflection element are in contact, the particle is brought in to contact with the reflection element by motion of the probe relative to the sample using a piezoelectric or other translation stage.

Figure 2:
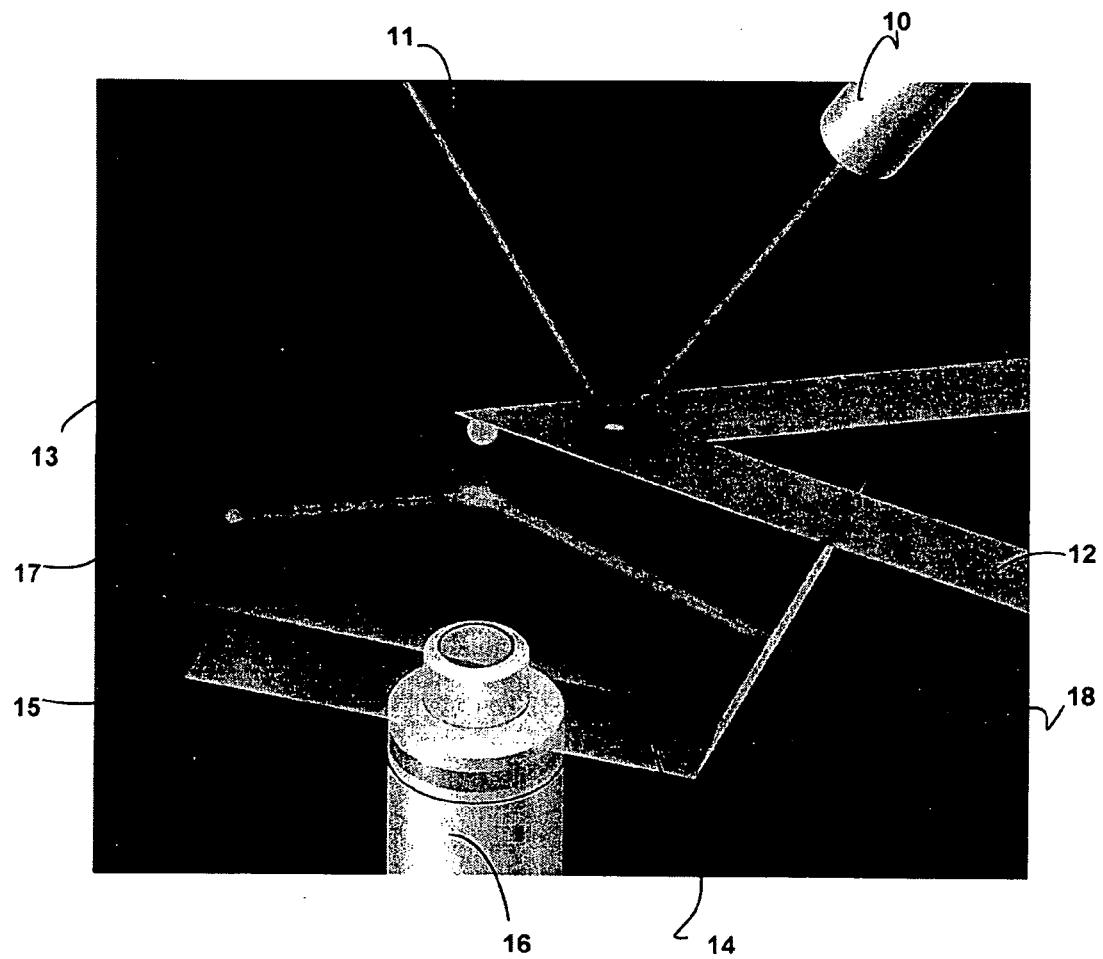
FIG. 2 is a schematic illustration of the evanescent wave atomic force setup.

Turning now to FIG. 2, the principle of operation of the direct measurement evanescent wave device is illustrated there. A colloidal sphere 13 is attached to a cantilever 12. A first incident laser beam 10 impinges on the cantilever 12 and is reflected from it as a first reflected beam 11 The force acting exerted on the sphere 13 by surface/interface 15 is determined from the change in position of beam 11 as reflected from the cantilever 12. A second incident beam 17 enters a prism 14 and is then internally reflected as a second reflected beam 18 at an interface 15 between the prism and the medium outside. An evanescent field (not shown in FIG. 2) is excited outside the prism as a result of total internal reflection of second incident beam 17 at interface 15. When the colloidal sphere 13 is dipped into the evanescent field, some amount of the evanescent field is scattered off sphere 13. Some of this field is scattered back into the prism 14 and is captured by a microscope objective 16. The intensity of the captured light is then recorded by a PMT (not shown in FIG. 2). In another manifestation, the second incident beam enters via the microscope objective.

Figure 3:
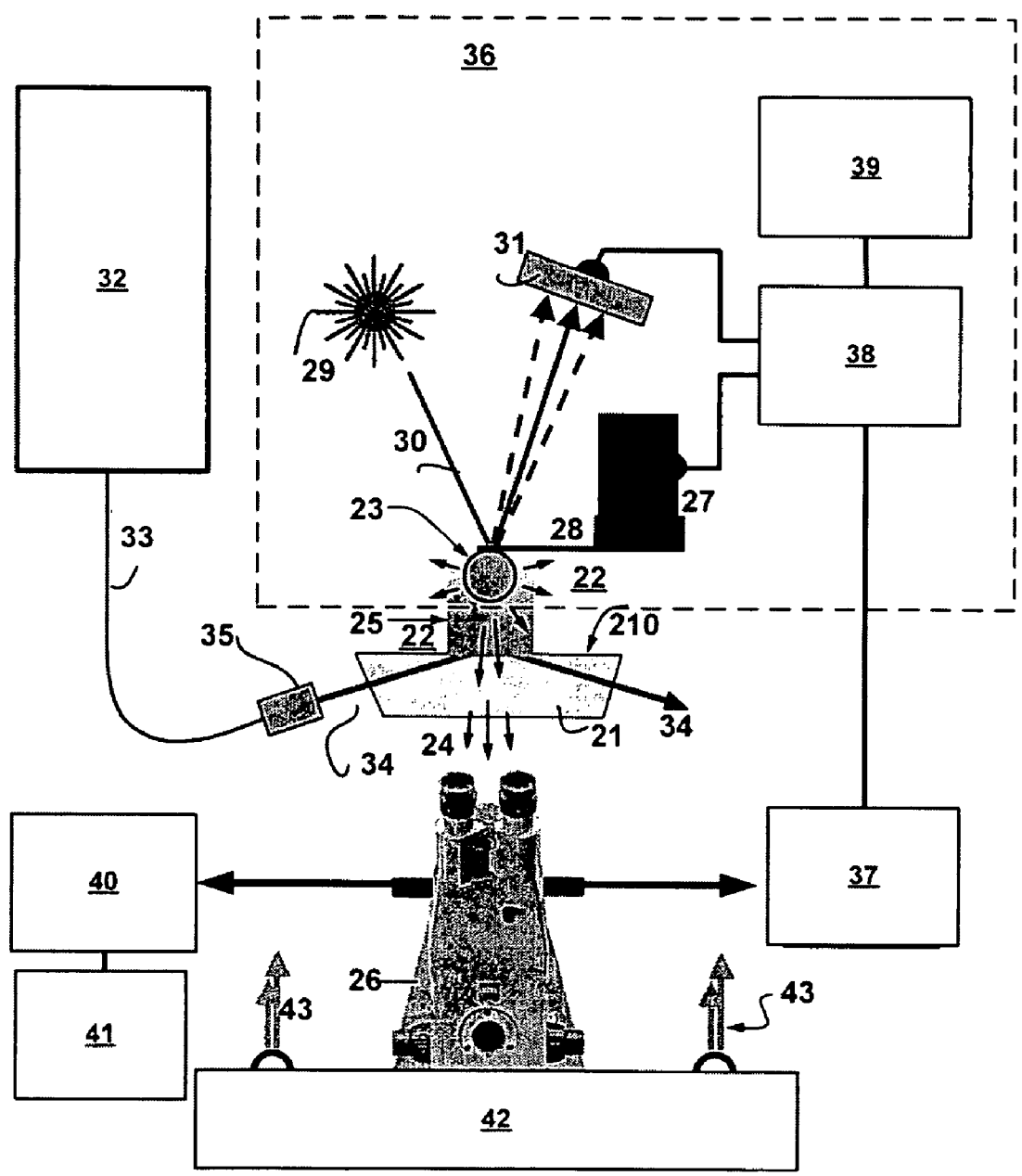
FIG. 3 is a schematic illustration of the evanescent wave atomic force microscope.

Turning now to FIG. 3, shown there is one of the embodiments of the present invention allowing one to measure evanescent wave scattering in a colloid probe AFM (for example, a PicoSPM Atomic Force Microscope by Molecular Imaging in Phoenix, Ariz., USA). Specifically, FIG. 3 shows a schematic evanescent wave Atomic Force Microscope (EW-AFM) in which an evanescent wave 25 is generated by total internal reflection of a laser beam 34 on a boundary 210 between a sample 21 and a medium 22. The EW-AFM microscope in FIG. 3 was built around an optical microscope 26 (for example, an Axiovert 200 inverted optical microscope by Carl Zeiss, Thornwood, N.Y., USA) and an Atomic Force Microscope, 36. Optical microscope 26 was used for viewing a probe 23 and detecting a scattered evanescent signal 24, similar to the function of the microscope objective 16 in FIG. 2. Instead of a microscope 26, another device for detecting scattered electromagnetic waves may be used, for example, a photodetector or a camera. The probe 23 may be, for example, a colloid probe, but this invention remains functional for any other type of probes interacting with the surface of the sample 21. In FIG. 3 the probe 23 is a part of an atomic force microscope 36, but it also can be a part of any other type of a scanning probe microscope. In the particular embodiment shown in FIG. 3, a trapezoidal quartz prism (Knight Optical, UK) served as an internal reflection element as well as sample 21. In other embodiments the sample could be a glass slide or dish and and the internal reflection element could be a lens. The magnitude of translation of the probe 23 normal to the sample 21 (in the Z-direction normal to the surface of boundary 210) may be controlled with a piezoelectric translation stage 27, which was calibrated against a 22.0 nm height standard from Silicon MDT (Moscow, Russia). The deflection of a cantilever 28 coupled to the probe 23 was detected through changes in the slope of the cantilever 28 where probe 23 is attached and where a laser beam 30 from a laser source 29 (for example a 670 nm beam from a diode laser) impinges onto the cantilever. The change in the slope of the cantilever 28 causes a change in the reflection angle of beam 30. Instead of a laser beam, another source 29 of electromagnetic radiation capable of reflecting off the cantilever 28 may used in other embodiments. The change of the reflection angle of the beam 30 after reflecting off the cantilever 28 is detected by a detection device 31, such as a photodiode or any other device suitable for detecting electromagnetic radiation. This method of determining the deflection is also known as the light lever method.

In one embodiment, the AFM 36 is connected to the optical microscope 26 via a custom aluminum plate allowing translation of the AFM 36 relative to the viewing (optical) axis of the optical microscope 26, and the prism 21 is fixed relative to the AFM 36, ensuring that the probe 23 may always be seen by the microscope 26.

Evanescent wave 25 is generated by totally internally reflecting beam 34 at boundary 210 between the sample prism 21 and medium 22. In FIG. 3 beam 34 comes from a separate radiation source 32, which is practical in the illustrated embodiment, but is not required. One example of a suitable light source 32 is a 1 W argon-ion laser (Innova Enterprise II, model 610, from Coherent, Santa Clara, Calif., USA) The output of the source 32 may be brought to the prism sample 21 by an optical fiber 33. Since the output of the source 32 may be dispersed by the prism sample 21, in the embodiment of FIG. 3 the 514.5 nm line is used for total internal reflection and generation of the evanescent wave 25. The electromagnetic radiation is coupled into a single mode optical fiber 33 and focused into a spot (about 100 µm in diameter in the present embodiment) on the boundary 210 of the prism 21 by a focusing means 35. A typical output power from the optical fiber in this embodiment is 35~50 mW. The incidence angle of the beam 34 for the shown setup is approximately 78°.

Because AFM 36 partly obscures the light scattered by the probe upward from the probe into the medium 22, it is more practical to detect the light that has been scattered back into the reflecting medium, which is sample prism 21. However, in other embodiments, the light could be detected at different angles. In FIG. 3 the microscope 26 collects the light scattered from the probe 23 back into the sample 21. After the scattered back light 24 is captured by the microscope 26, the intensity of scattered light 24 may be measured and monitored by sending the scattered back light signal to a photomultiplier tube (PMT) 37 (for example, HC120-01 from Hamamatsu with a model E3630).

A portion of beam 30, which is used for detection of the deflection of cantilever 28, impinges on the objective of microscope 26 and is captured by the microscope in addition to the captured scattered back light 24. For example, beam 30 can be the 670 nm laser, while beam 34 can be the 514 nm laser. Since the intensity of such portion of the 670 nm beam 30 may be greater than the intensity of scattered 514 nm light 24, a filter (such as Part No. 514DF20 from Omega Optical, Brattleboro, Vt., USA) may be used to eliminate the unwanted portion of beam 30. The analog voltage output from the PMT 37 may be digitized by the corresponding AFM electronics 38 synchronously with the voltage applied to displace the piezoelectric translation stage 27 and record the information about the deflection of cantilever 28 supplied by the detection device 31. The use of this invention is not limited to the particular wavelength of radiation mentioned above.

The data from AFM electronics 38 may be collected into a computer 39. The light captured by the microscope 26 may be further monitored by a CCD camera 40 coupled to a monitor 41. The microscope 26 may be mounted on an optical table 42 equipped with vibration isolation means, such as bungee cords.

In some embodiments the medium 22 into which the generated evanescent field propagates can be a liquid solution disposed between the probe 23 and the sample 21 in a fluid cell. The fluid cell may consist of a Teflon cylinder of about 1.5 cm diameter that is press-fit against the reflection element 21. The other side is open to the air. Fluids can be exchanged via input ports of the AFM 36. One example of a suitable liquid solution is a 0.9 mM aqueous solution of hexadecyltrimethylammonium bromide ($C_{16}$TABr). The CTABr from Aldrich is recrystallized three times from acetone and the water is prepared using a Nanopure water purifier by Barnstead. The data discussed below were obtained by using a borosilicate glass sphere of radius ~3 μm and a refractive index $n_p$, of 1.46 as the probe 23 (from Polysciences, Warrington, Pa., USA). The probe 23 is attached to the end of an AFM cantilever 28 (spring constant 1.4~2.1 N/m from Park Scientific, Sunnyvale, Calif., USA) with the Epikote 1004 glue. Probes with a refractive index closer to that of water (such as silica spheres with $n_p$~1.37 from Bangs Laboratories, Fishers, Ind., USA) produce less scattering, and probes with a greater refractive index (such as polystyrene) produce greater scattering.

There was a wide variety of scattering intensities from borosilicate colloidal probes that had similar sized spheres. It is suspect that some of the intensity that is sensed by PMT 37 may originate from light that is transmitted through the probe and is then reflected from the cantilever and or the tip. The scattering signal would then depend on the exact position of the sphere relative to the tip and the cantilever. However, one advantage of the present EW-AFM method is that that we can easily calibrate the scattering for each colloidal probe, so a detailed understanding of the scattering is not required for interpreting the experimental data.

Figure 4A:
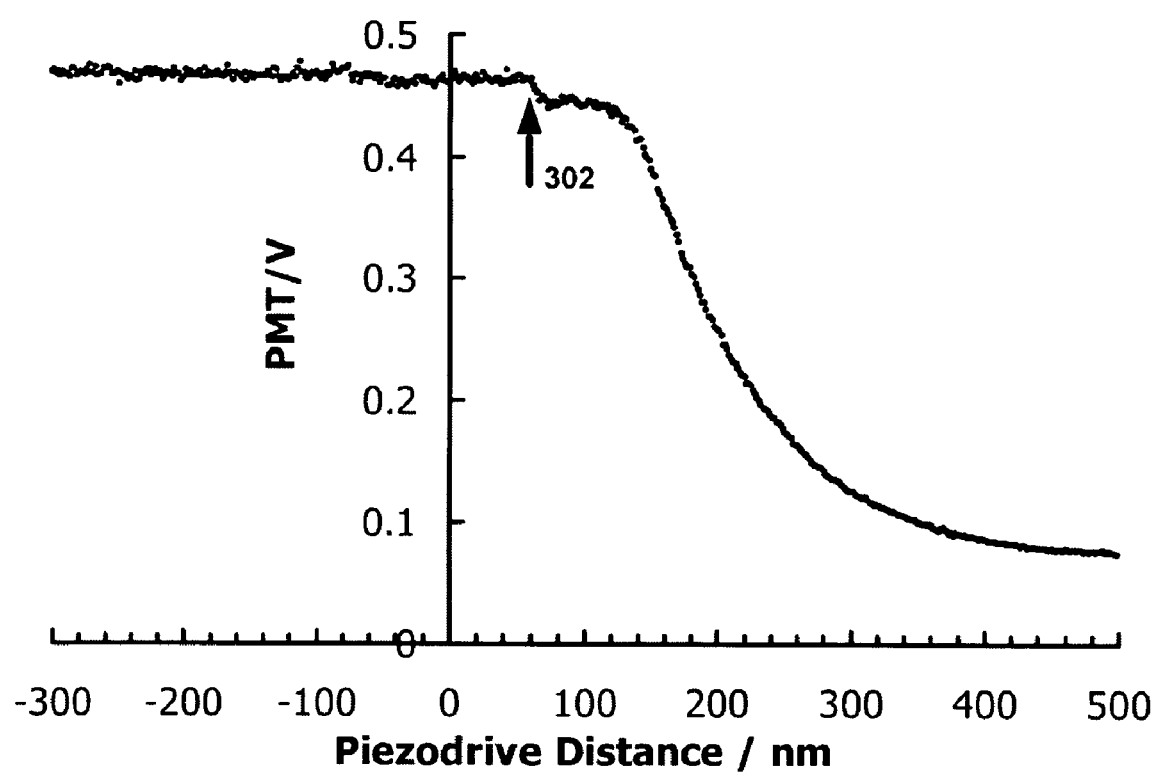
FIG. 4A is a graph illustrating raw intensity data as a function of piezo-drive distance.

The measurements performed with the EW-AFM according to the above-described method evidence the exponential decay of the intensity of the evanescent field scatted back by the probe 23. FIG. 4A shows the measured relationship between the intensity of the scattered back evanescent light 24 (expressed as the voltage on the PMT 37 output) and the displacement of piezo-drive 27. The measurements were obtained by ramping the piezo drive and measuring the intensity of the scattered back light. As FIG. 4A illustrates, the intensity of the scattered back light 24 from the colloid probe 23 detected by the PMT 37 varied exponentially with distance h between the probe 23 and the reflection element 21, similar to the exponential decay of intensity of the evanescent field 25 in medium 22. In order to use equation (1) for calculating I(h), the background intensity was subtracted first. The background intensity is the amount of light that falls on the PMT 37 when the particle probe 23 is far from the reflection element sample 21, and which amount of light therefore does not arise from scattering of the evanescent wave 25. Hereinafter, the symbol I or I(h) is used to represent the intensity after the background has been subtracted. The intensity minus background is also obtained when there is a zero separation between the colloidal probe 23 and the sample 21 ($I_0$). Subtracting the background can also be done by inspecting the curve on FIG. 4A and noting when the intensity reaches a plateau. The constant compliance region of the AFM deflection-displacement curve may also be used to find the correct region of the data for $I_0$.

In some embodiments the value of $I_0$ may be determined once at the beginning of the measurement by bringing the particle probe 23 into contact with the sample 21 in some condition where one expects a steep potential well (e.g. solvent only). Then all subsequent separation data may be referenced to this combination of position and intensity. In other embodiments, a constant value of $I_0$ may rely on a constant intensity of illumination by the laser beam 34 and a constant background (constant scattering by objects other than the particle probe 23). Alternatively, the incident laser intensity could be monitored over time, and used to normalize $I_0$.

Figure 1A:
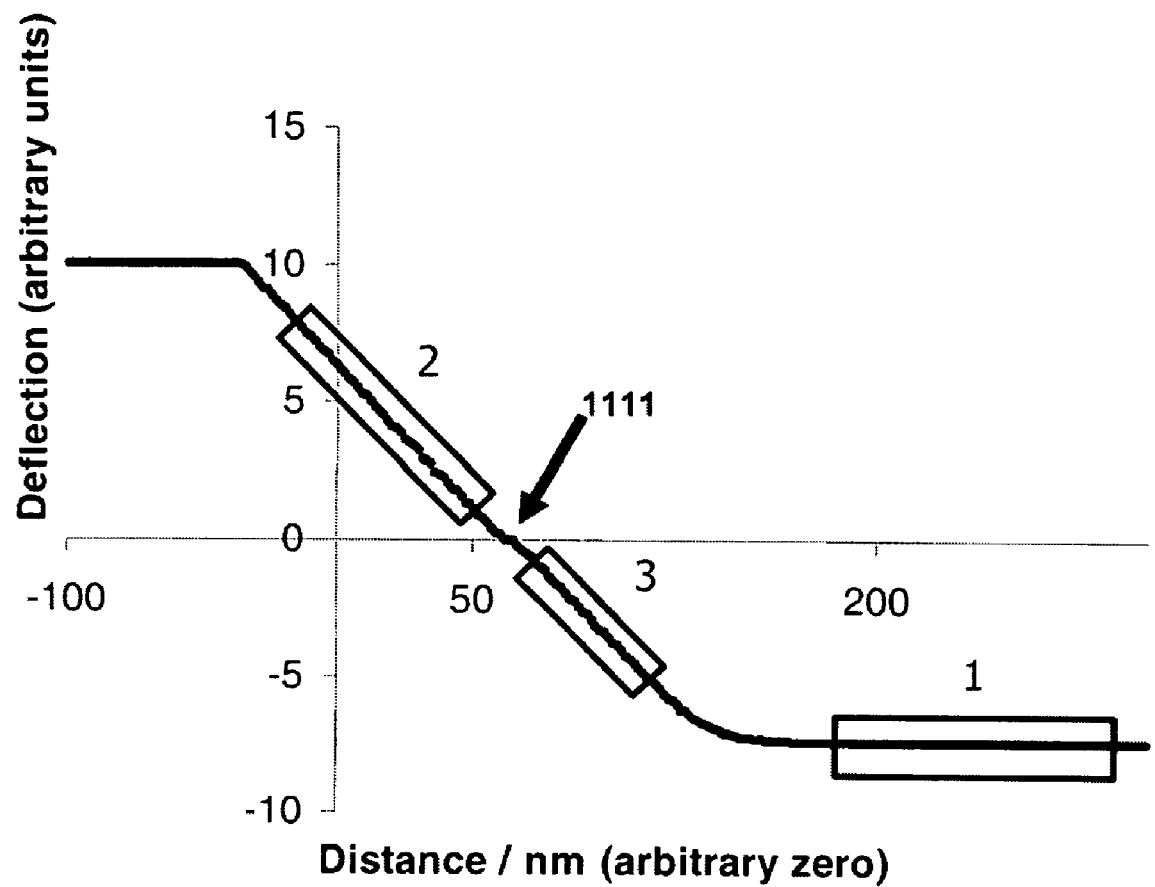
FIG. 1A shows the non-calibrated deflection-separation data.

The arrow 302 in FIG. 4A is in the same position as arrow 1111 in FIG. 1A, and indicates the yielding of the adsorbed surfactant layer.

In some embodiments, the separation, h, may be determined by measuring I and another physical property such as the hydrodynamic resistance, or I as a function of wavelength or incident angle, θ, so as to effectively obtain $I_0$.

Figure 4B:
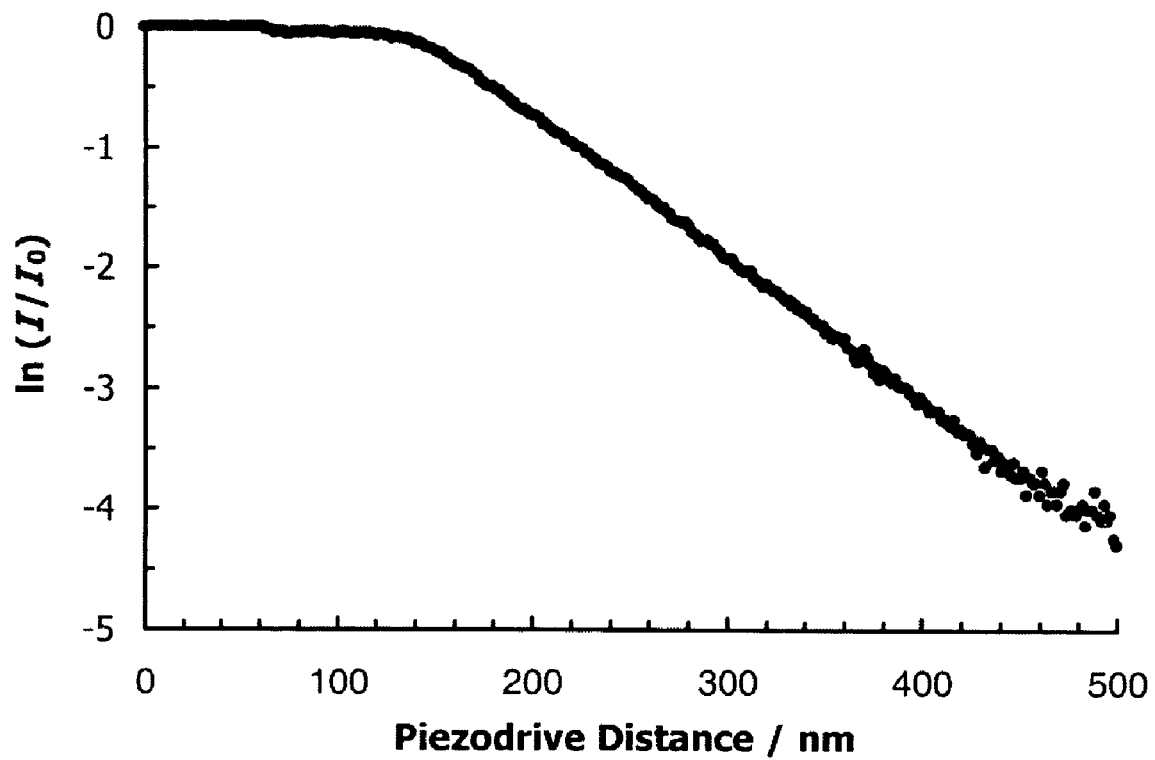
FIG. 4B is a graph illustrating $\ln(I_0/I)$ as a function of piezo-drive distance.

FIG. 4B shows $\ln(I/I_0)$ as a function of a piezo-drive distance. It shows that $\ln(I_0/I)$ is linear with separation between the probe 23 and the sample 21, in this embodiment, out to about 350 nm separation; and that at larger separations the noise in the scattering is too large to make accurate measurements of the functional form. The measured decay length (from the slope in FIG. 3B) is 83±1 nm, while the value calculated from equation (1) for I(h) is about 79 nm. This latter value was calculated using the following parameters: incidence angle, θ=78±0.3°, $n_1$ (at the 514 nm wavelength)=1.4616 (values supplied by Saint Gobain, France, for SPECTROSIL® grade silica), and $n_2$ (at the 580 nm wavelength)=1.3328. This discrepancy is reasonable considering the error in calibrating the piezo-drive 27 (~5%), and the error arising from the uncertainty in estimating the incidence angle of the beam 34 (~1%). Deviations from a linear form of $\ln(I_0/I)$ may arise from instrumental issues such as a non-linearity of piezo drive 27, more complex scattering phenomena, or a change in or inhomogeneous refractive indices. In addition, deviations from linearity may occur when the cantilever 28 deflects in response to a surface force acting on the particle probe 23. In the embodiments where the surface force is known to be very short ranged (e.g., 0.1 $M_{(aq)}$ NaCl), the $\ln(I_0/I)$ function is approximately linear down to a separation of about 5 nm. Deviations from linearity become significant for distances less than 160 nm, as can be seen in FIG. 4B, because the cantilever 28 has deflected under an applied surface force. Thus, changes in separation between the probe 23 and the sample 21 are no longer equal to changes in the position of the piezo-drive 27. This deviation may be used to measure the deflection of the cantilever and the corresponding force, which is shown below in FIG. 5A. The constant zero value of $\ln(I/I_0)$ (at distance <~60 nm) in FIG. 4A corresponds to the region 2 in FIG. 1A.

Figure 5A:
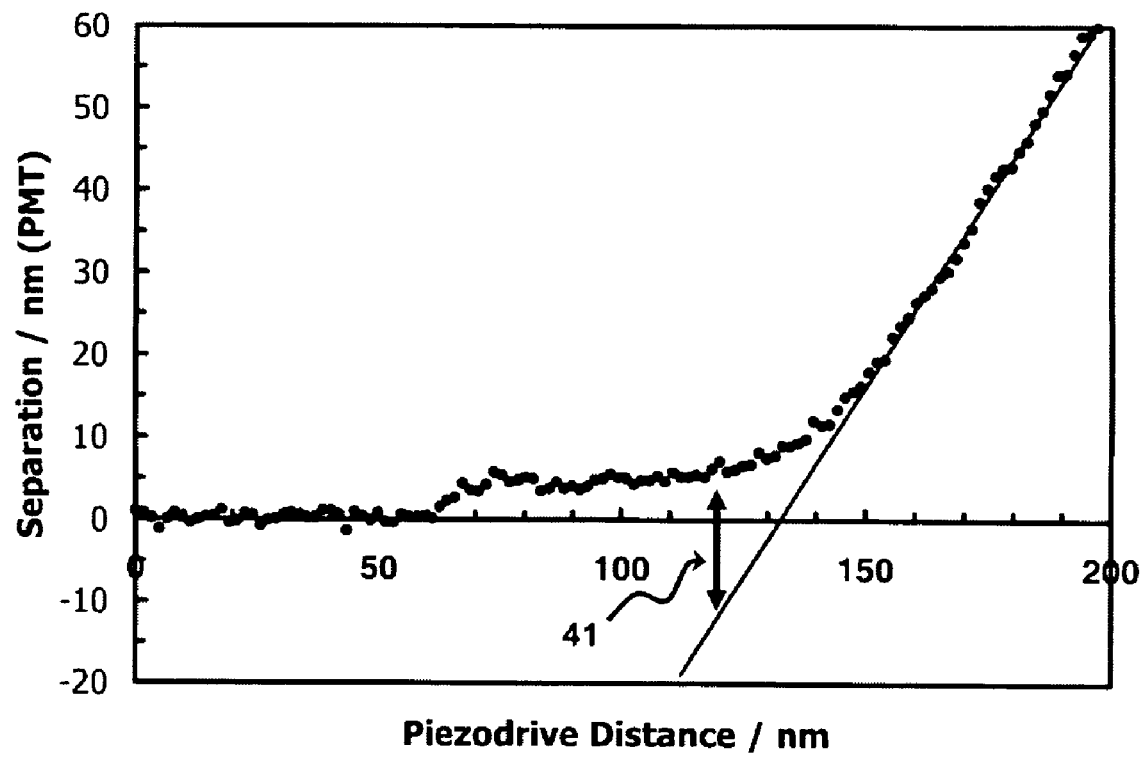
FIG. 5A is a graph illustrating separation as a function of piezo-drive calculated from the $\ln(I_0/I)$ data in FIG. 4B.
Figure 5B:
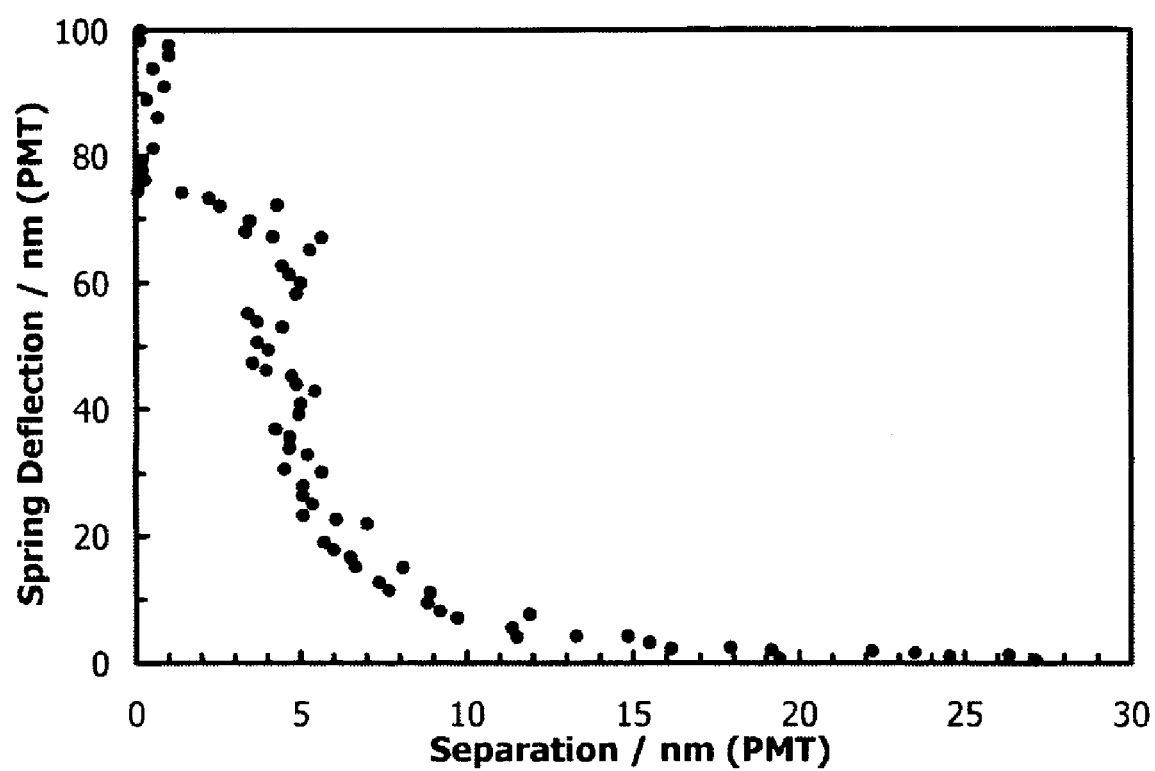
FIG. 5B is a graph illustrating deflection of a cantilever as a function of separation.

The results of the measurements of the force profile are presented in FIGS. 5A and 5B, showing the deflection of the cantilever determined from the deviation from linearity of the evanescent wave scattering in FIG. 4B as a function of the separation measured by evanescent wave scattering. The graph in FIG. 5A is obtained by replotting the raw intensity data from FIG. 4A with separation calculated from $\ln(I/I_0)$ from FIG. 4B. The force was calculated as the deflection times the spring constant. The deflection 41 is determined from the deviation between the separation corresponding to the measured data and expected separation if the linear region were to continue to smaller separations.

FIG. 5B shows a graph of the cantilever deflection, calculated from evanescent scattering of the beam 34 as a function of separation, also calculated from the evanescent scattering. Deflection cantilever 28 was determined from the deviation from linearity of the evanescent wave scattering in FIG. 4B as a function of the separation measured by evanescent wave scattering. The force was calculated as the deflection times the spring constant. The deflection curve is very similar to that measured using the AFM 36 (if compared to FIG. 1B where the spring deflection was determined using the light lever technique), which similarity shows that one may use the evanescent wave data alone to measure a force curve (without the AFM light lever method) while the AFM can simply be used as a flexible support of known stiffness.

It becomes evident that one of the advantages of using the evanescent scattering technique to the measure the force curve in accordance with the EW-AFM method is the ability to measure forces in an absorbing or opaque liquid. Because the path length of the AFM laser beam 30 is on the order of millimeters, whereas the path length for the evanescent field 25 (shown in FIG. 3) in the fluid is <100 nm, the absorbance will be much less in the evanescent field. Thus the evanescent field scattering technique may be used to measure force curves in fluids with a transmittance that is too low for the traditional colloidal probe technique.

Another advantage of the described EW-AFM method is that the optical fringes produced by interference between the light reflected from the sample and light reflected from the cantilever may sometimes distort the measured force profile. This problem may be easily circumvented in the new technique by simply turning off the AFM laser beam 30.

Figure 6:
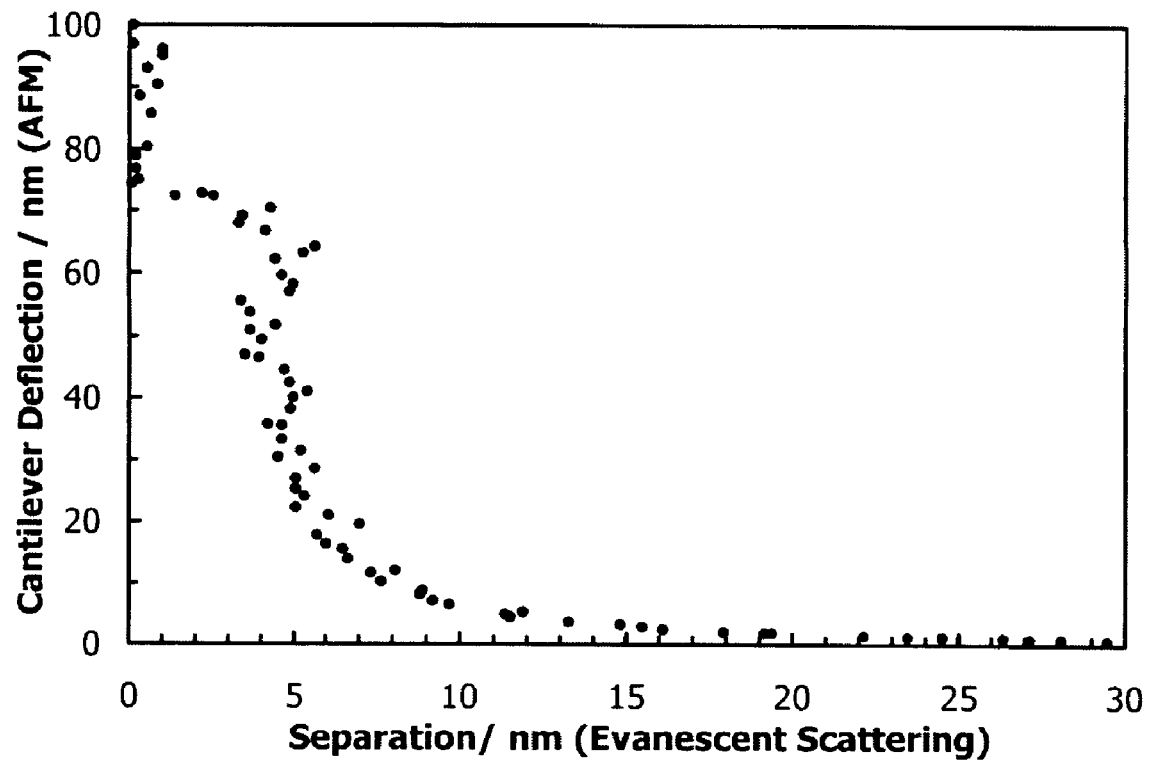
FIG. 6 is a graph illustrating analysis using the scattering signal from the PMT to calculate the separation and the AFM photodiode to measure the cantilever deflection.

FIG. 6 shows the measured force (expressed as the cantilever deflection) as a function of the separation when the force has been determined using the light lever method and the separation has been determined from the evanescent scattering. At the vertical portion of the force at about 5 nm, the total scatter in distance is about ±1 nm. The standard deviation for these 25 points is 0.6 nm, and the standard deviation for the first 10 points in contact is 0.37 nm. This resolution is sufficient to perform force measurements. Much of the noise arises from the random fluctuations in the intensity of the incident laser beam 34, which may be minimized by (a) conditioning the incident laser beam 34 used to produce the evanescent wave prior to reflection, such as with an electro-optic laser stabilization system, and (b) collecting more points and averaging the signal (i.e., if the noise is random, then the fluctuations should average to zero) and (c) by employing a quieter laser, such as a diode pumped laser.

Figure 1B:
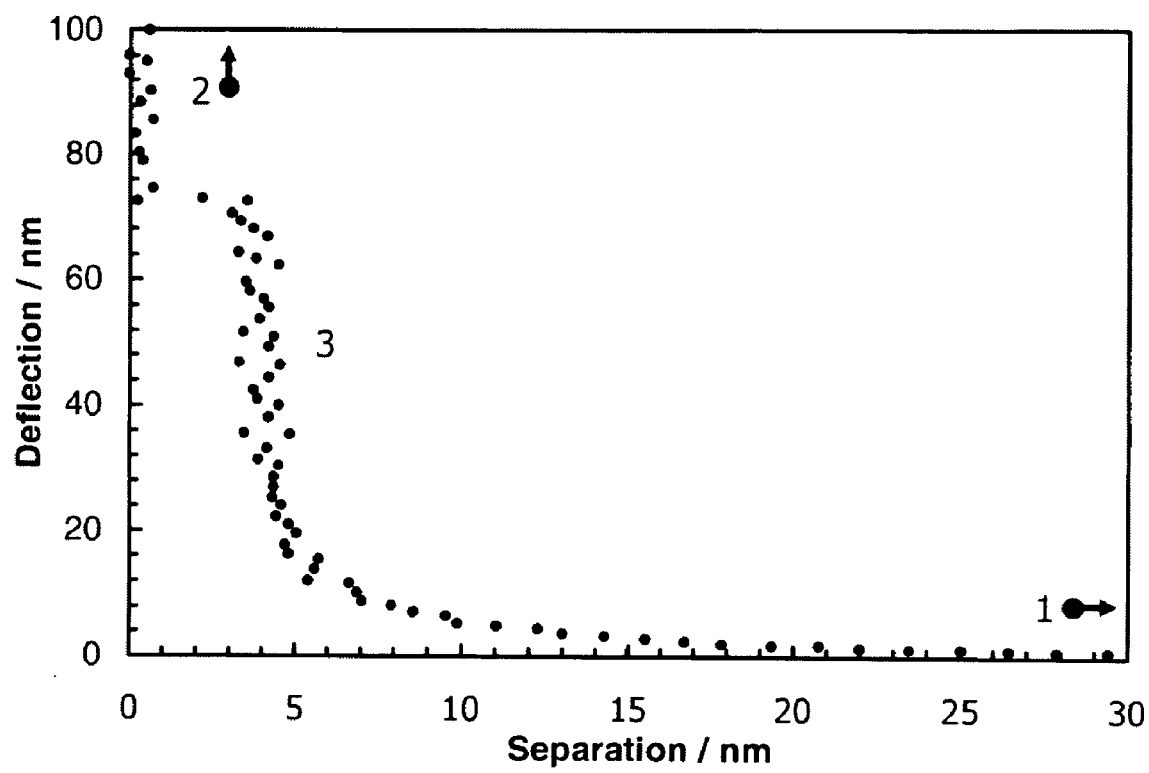
FIG. 1B shows the calibrated deflection separation data.
Figure 7:
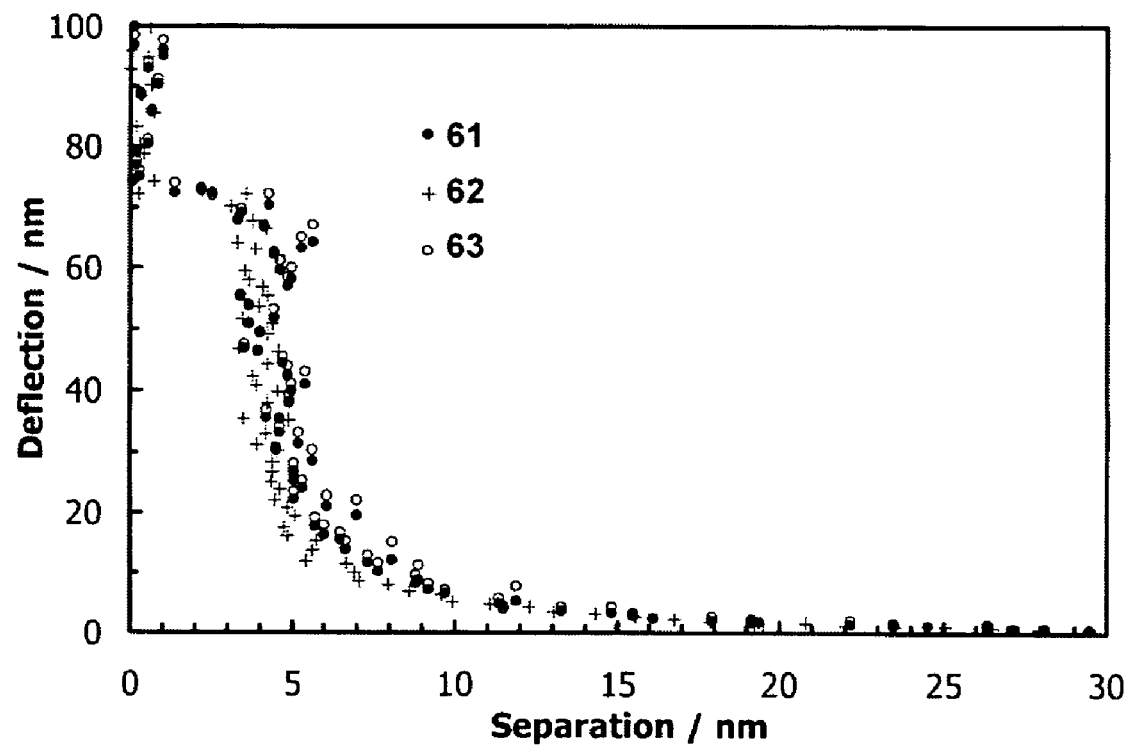
FIG. 7 is a graph illustrating comparison of different analysis methods used in FIGS. 1A-B, 5A-B and 6.

FIG. 7 compares the measured force-separation curves for three different analysis methods. Data plotted as 61 are the deflections measured by the light lever method versus the separations measured by evanescent scattering (as shown in FIG. 6). Data plotted as 62 are the deflections measured by the light lever method versus the separations measured by a combination of piezo-drive data and the light lever method (as shown in FIG. 1B). Data plotted as 63 are the deflections measured by evanescent scattering versus the separations measured by evanescent scattering (as shown in FIG. 5B). Note that the piezo-drive was used to calibrate the evanescent scattering and the light lever method. The good agreement between the three sets of data validates the use of the evanescent scattering signal for force measurements.

The EW-AFM method and its various embodiments have a number of advantages over the traditional colloid probe technique for studying interaction forces. The evanescent wave scattered off the probe provides a way to directly measure the distance separating the probe and the sample. After an initial calibration of the evanescent field decay, one does not need to rely on the linearity of the piezo-drive 27 response or the diode detector 31 of the AFM 36. It is also not necessary to press the probe 23 against the surface 210 to calibrate the cantilever 28 deflection, which is advantageous for such surfaces 210 that could be soft or fragile. With the addition of a feedback loop, the force measurements can be performed at a constant separation by feeding back on the evanescent signal. Because the evanescent scattering signal is still detectable at distances well beyond the range of many surface forces (250 nm compared to less than 100 nm for most surface forces), it is becomes possible to determine when the probe 23 is approaching the surface 210 while yet still not experiencing a significant force from the surface 210. This is an advantage for those measurements when the first contact with the surface 210 may be different from subsequent contacts, as could be the case with fragile samples or cavitation-inducing hydrophobic samples.

The intensity of scattering of the evanescent wave is detected by a photomultiplier tube, photodiode or other light sensitive technique. The signal from the detector is compared to a standard intensity, "the setpoint", that is set by the user. Because the scattering intensity measures an optical height above the solid sample, the choice of a setpoint represents a choice of the height of the probe above the sample. The comparison is made by an operational amplifier or other electronic circuit: the circuit takes the difference between the setpoint and the actual scattering signal and supplies a signal to move a translation stage so as to change the separation between the probe and the solid. This process produces negative feedback because the separation defines the scattering and the scattering defines the change in separation via the translation stage. The effect of the negative feedback is to produce a constant scattering signal that is set by the user. The constant scattering signal corresponds to a constant height above the sample. In summary, a method has been established for maintaining a constant height above the sample. A map of a physical property of the surface (an image) can be obtained by use of an additional, two dimensional, translation stage to translate the probe parallel to the solid surface. The two dimensional translation stage is used to position the tip, sequentially, at all positions on a grid above the surface, while the feedback loop is activated. The feedback loop maintains a constant height above the surface. During this process, an additional variable is measured. The new variable will be dependent on a property of the probe-solid system. For example, the property could be the conductivity or tunneling current or force between the probe and the solid. A record of this additional property as a function of grid position constitutes a map of the surface. A map can also be made by using the additional property as the input to the feedback loop while keeping a record of the change in scattering to maintain the setpoint.

A scanning probe microscope uses translation stages to move a probe relative to a solid. To provide a map of the solid, an Atomic Force Microscope keeps an accurate and precise record of the change in positions of the probe relative to the solid. Translation stages are actuated by applying a known voltage or current to the stage, and the translation is then calculated by transforming the voltage or current into a distance. Translation devices can be mechanical, piezoelectric, electrosensitive or others, as called for by a particular application. The functional form of this transformation (the calibration) is obtained by moving the stage a known distance and measuring the voltage or current required to effect the translation of this distance. In other words, calibrations call for a method of obtaining or measuring a known distance. The evanescent scattering signal provides a direct measure of the separation between a probe and a solid, and thus scattering can be used to obtain a known distance and to calibrate a translation stage. Evanescent scattering is particularly useful in such context, because it provides a continuous measurement of distances in the range of 0-300 nm, useful to scanning probe microscopes.

The scattered evanescent wave signal can also be used for spectroscopy. If a range of frequencies of beam 34 is used, the molecules in the thin film between the probe 23 and sample 21 can be identified. Absorption of light by these molecules is distinct from the absorption of light by the molecules adsorbed to other regions, because the adsorption depends on the separation between the probe 23 and the solid substrate. Alternatively, if the separation distance is obtained from a conventional AFM analysis, the amount of material in the gap may be determined by monitoring either absorption or scattering by fluorescently-labeled material.

As described above, if the deflection is not measured by the AFM 36, moderately absorbing or opaque liquids may be used as medium 22. In addition, the force measurement is not affected by interference from the AFM laser beam 30.

Another significant advantage of using the scattered evanescent signal is that it allows measurement of the thickness of a thin film during a force measurement. If a stable reference value of $I_0$ is obtained, the optical thickness of the thin film is determined by measuring I. For example, in conventional colloidal probe work between two solids, if a force-separation curve is measured in the presence of an adsorbate (thin film), there is no way of uniquely establishing whether the probe is in contact with the solid or if there is an intervening thin film. If a force-separation-evanescent scattering intensity run is performed in the absence of an adsorbate and then again after the adsorbate has been added, then the presence of a thin intervening film may be identified through the diminished evanescent scattered back signal, compared to $I_0$, when a large repulsive force is measured. By pushing the probe through the layer, the thickness and spatially-averaged refractive index may be measured by combining the optical distance from the scattered back signal and the displacement of the probe 23 from a conventional colloid probe analysis.

Other advantages of embodiments of this invention arise from greater control over the displacement of the particle probe 23. The particle probe 23 is brought into contact with the solid sample 21 at any time in order to check $I_0$. This is especially useful if a second, unwanted particle migrates and deposits near the test particle, thereby changing the background signal and hence $I_0$. The AFM stage may be used to push and pull the particle probe 23 over the energy barriers near the surface 210.

Embodiments of this invention may also be used for energy-separation measurements. For a constant position of the piezo-drive 27, the separations may be monitored over time by using the evanescent scattering signal. A histogram of separation frequency may then be used to determine the energy as a function of separation using the Boltzmann's equation. This energy includes the energy of the spring deflection, so the spring constant must first be measured at large separation where there is no surface force. One advantage of adding the potential of the spring is that one may measure more of the energy-separation curve. The attachment of the spring may be used to alter the total potential so that new positions, e.g., the maxima in oscillatory forces or attractive forces, become accessible. If a thermal drift in the dimensions of the connections between the probe 23 and the sample 21 cause changes in the zero of the spring potential, the drift may be monitored by measuring the deflection of the AFM spring or the change in the histogram with time.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining separation between a first medium and a scanning probe disposed in a second medium, the method comprising:
    generating an evanescent electromagnetic field propagating beyond an interface between the first medium and the second medium into the second medium;
    generating a scattered electromagnetic field by scattering the evanescent electromagnetic field off the scanning probe;
    measuring an intensity of a portion of the scattered electromagnetic field that is scattered back into the first medium; and
    calculating the separation between the first medium and the scanning probe as a function of the intensity of the portion of the scattered electromagnetic field.

2. The method of claim 1, wherein generating the evanescent electromagnetic field comprises totally internally reflecting electromagnetic radiation at the interface between the first medium and the second medium.

3. The method of claim 2, wherein totally internally reflecting electromagnetic radiation comprises directing a laser beam onto the interface.

4. The method of claim 1, wherein the scanning probe is coupled to a cantilever of an atomic force microscope.

5. The method of claim 1 wherein the scanning probe is a probe of an atomic force microscope.

6. The method of claim 1, wherein the first medium is a sample and the second medium as a fluid.

7. The method of claim 1, further comprising providing a feedback loop for controlling the scattered electromagnetic field.

8. The method of claim 1, wherein capturing the scattered back light is done by an optical device.

9. An evanescent scattering apparatus for determining separation between a first medium and a scanning probe, the apparatus comprising:
    the first medium having a boundary;
    means for generating an evanescent electromagnetic field propagating beyond the boundary and away from the first medium;
    means for measuring an intensity of a scattered electromagnetic field formed as a result of scattering of the evanescent electromagnetic field by the scanning probe and scattered back into the first medium; and
    a detector coupled to the means for measuring and serving to determine an intensity of the scattered electromagnetic field to be used in determining the separation.

10. The evanescent scattering apparatus of claim 9, wherein the means for generating an evanescent electromagnetic field comprise a laser source.

11. The evanescent scattering apparatus of claim 9, wherein the means for measuring the intensity of the scattered electromagnetic field comprise an optical device.

12. The evanescent scattering apparatus of claim 9, wherein the first medium is a sample.

13. The evanescent scattering apparatus of claim 9, wherein the means for measuring is positioned outside the first medium at a location in which the intensity of the scattered electromagnetic field can be measured by the means for measuring.

14. A scanning probe microscope having an evanescent scattering apparatus, the scanning probe microscope comprising:

a scanning probe coupled to a piezo-drive;
an incident medium with an interface:
a laser source for generating a laser beam directed onto the interface, for totally internally reflecting the laser beam at the interface and for generating an evanescent electromagnetic field propagating toward the scanning probe;
an optical device for measuring an intensity of a portion of the evanescent electromagnetic field scattered by the scanning probe into the incident medium, the optical device having an optical axis along which the scanning probe car be displaced by the piezo-drive; and
a detector coupled to the optical device to detect an intensity of the portion of the evanescent electromagnetic field scattered by the scanning probe into the incident medium.

15. The scanning probe microscope of claim 14, wherein the incident medium is a sample.

16. The scanning probe microscope of claim 14, wherein the interface is located between the incident medium and a transmitting medium.

17. The scanning probe microscope of claim 14, wherein the optical device is an optical microscope.

18. The scanning probe microscope of claim 14, further comprising a controller electrically coupled with the detector and the piezo-drive.

19. The scanning probe microscope of claim 16, wherein the transmitting medium is fluid.

20. The scanning probe microscope of claim 19, wherein the fluid is a strongly absorbing liquid.

21. The scanning probe microscope of claim 14, wherein the incident medium is a prism.

22. The scanning probe microscope of claim 14, wherein the microscope is an atomic force microscope.

23. The scanning probe microscope of claim 22, wherein the scanning probe is coupled to a cantilever coupled to the piezo-drive.

24. The scanning probe microscope of claim 23, wherein the cantilever is optically coupled to a second laser source and a second detector.

25. The scanning probe microscope of claim 14, further comprising a feedback loop for maintaining a constant separation between the scanning probe and the interface.

26. The scanning probe microscope of claim 14, further comprising a feedback loop for maintaining a constant signal such as conductivity, force, or tunneling between the scanning probe and the interface while measuring the scattering of an evanescent wave.

27. The scanning probe microscope of claim 14, further comprising a feedback loop for maintaining a constant separation between the scanning probe and the interface while measuring a frequency distribution of scattered radiation from a broadband source or the intensity of radiation of a narrow frequency that is designed to be absorbed by the scanning probe or molecules adhering to the probe or by other molecules situated between the probe and the first medium.

28. The method of claim 14, further comprising a translation stage coupled to the piezo-drive.

29. The method of claim 28, wherein the intensity of the portion of the evanescent electromagnetic field is used for calibrating the translation stage.

* * * * *